United States Patent
Nordeen

(10) Patent No.: US 6,736,128 B1
(45) Date of Patent: May 18, 2004

(54) MULTIPLE MODE CHARCOAL COOKER

(76) Inventor: Cleve Ericson Nordeen, 139 Francis Marion Dr., Wilmington, NC (US) 28411

( * ) Notice: Subject to any disclaimer, the term of this patent is extended or adjusted under 35 U.S.C. 154(b) by 118 days.

(21) Appl. No.: 10/102,262

(22) Filed: Mar. 20, 2002

Related U.S. Application Data
(60) Provisional application No. 60/304,831, filed on Jul. 13, 2001.

(51) Int. Cl.[7] ................................................. A47J 33/00
(52) U.S. Cl. ..................................... 126/25 R; 126/9 R
(58) Field of Search ............................. 126/25 R, 9 R, 126/9 B, 38

(56) References Cited

U.S. PATENT DOCUMENTS

| | | | | |
|---|---|---|---|---|
| 2,244,935 A | * | 6/1941 | Binger | 126/9 R |
| 2,666,426 A | * | 1/1954 | Pollard | 126/25 R |
| 2,902,026 A | * | 9/1959 | Hathorn | 126/25 R |
| 3,851,639 A | * | 12/1974 | Beddoe | 126/25 R |
| 3,915,144 A | * | 10/1975 | Tomita | 126/9 R |
| 4,165,683 A | * | 8/1979 | Van Gilst | 99/393 |
| 4,503,835 A | * | 3/1985 | Williams | 126/25 B |
| 4,788,906 A | * | 12/1988 | Starks | 126/25 R |
| 4,878,476 A | * | 11/1989 | Oliphant | 126/9 R |
| 6,189,528 B1 | * | 2/2001 | Oliver | 126/25 R |

FOREIGN PATENT DOCUMENTS

| | | | | |
|---|---|---|---|---|
| JP | 63-267839 A | * | 11/1988 | F24C/1/16 |
| JP | 2003-88476 A | * | 3/2003 | F24C/1/16 |

* cited by examiner

*Primary Examiner*—Josiah Cocks
(74) *Attorney, Agent, or Firm*—Mills Law Firm PLLC

(57) ABSTRACT

A portable charcoal cooker includes a housing having side doors for loading starting materials and charcoal in separate compartments, a grill rack above the compartment, and a pivoting cover provided with a handle for transporting the cooker. The cooker is placed on end with the top door open to lights the starting materials and ignite the charcoal. After the charcoal is lit, the cooker is placed on its base and the cover opened to present the cooker rack for cooking.

9 Claims, 10 Drawing Sheets

MULTIPLE MODE CHARCOAL COOKER

RELATED APPLICATION

This invention claims the benefit under 35 USC 121 of U.S. Provisional Application No. 60/304,831 filed on Jul. 13, 2001 in the name of Cleve E. Nordeen and entitled "Portable Charcoal Grill".

FIELD OF THE INVENTION

The present invention relates generally to outdoors cooking devices and, in particular, to a charcoal fired cooker that may be charged with charcoal and ignition materials, transported to a cooking site, and thereafter ignited and deployed in a plurality of cooking modes.

BACKGROUND OF THE INVENTION

Charcoal cooking is a popular form of outdoor food preparation. Large and elaborate cooking apparatus is available for cooking at home. There are many occasions away from the home where this cooking form is also desirable, such as camping, picnics, and other such gatherings. The home cooking apparatus is not readily transportable to such sites. Smaller units have been proposed for these activities, generally in the form of smaller, lightweight units. In addition to transporting these cookers, the charcoal fuel and starting materials, such as lighter fluid, must be separately handled. After use, the cooker must be emptied and cleaned, and along with the remaining charcoal fuel and lighter fluid, repacked for the return visit. Because of these attendant problems, inexpensive grills are often left at the site.

These grills are generally open configurations, without lids, wherein a grill rack is placed over the ignited coals, and the cooking is done only in a conventional grilling mode. Only a single cooking mode is provided, and, accordingly, accessory cooking units are required for heating, warming, frying and the like. Where such auxiliary equipment is not available, certain foods must be prepared in advance and held until use in insulated containers.

To simplify the starting of the charcoal, and eliminate liquid starting fuels, chimney devices have become popular. Therein, a cylindrical container is loaded with a paper source, such as crumpled newspaper, on which the charcoal is layered. Lighting the paper serves to ignite the charcoal, with the convection through the container assisting the process. The ignited coals are then distributed in grills of the above mentioned type. U.S. Provisional Application No. 09/799.716 to Patience discloses a folding charcoal grill that incorporates a folding design wherein a chimney-type orientation is used to start the charcoal, and thereafter rearranged to provide a direct radiant heat grill.

In view of the foregoing limitations, it would be desirable to provide an outdoor charcoal cooker that is easy to transport, easy to start, and can perform the various cooking activities associated with outdoor cooking.

BRIEF SUMMARY OF THE INVENTION

The present invention provides a single compact, versatile portable charcoal cooker that may be fully charged at home with charcoal fuel and starting materials, enclosed in an easily transportable unit, transported to the activity sight without risk of spillage or separation, conveniently ignited, and when ready deployed in a plurality of cooking modes including grilling, flying, heating, warming, griddle cooking, roasting and baking. During startup and cool down, the cooker operates in a self cleaning mode, eliminating the need for conventional scraping and scouring prior to use. After use, the ashes may be conveniently and safely disposed and the unit converted to a sealed carrying mode and stored for the next use.

The cooker includes a firebox base having an open top covered by a pivoting lid and open sides covered by sliding, vented doors. A grill rack is fixedly attached to the base at the top opening and defines therebelow a heating chamber. A flat griddle is provided that is carried by the grill rack. The heating chamber is divided into upper and lower sections by a pivoting gate. A starting material such as crumpled newspaper is placed the lower section and charcoal layered in the upper section. The gate is maintained in the closed position by a stop plate on the lower surface of the griddle. After initial preparation, the cooker is closed and locked for transportation to the cooking site. At the site, the cooker is vertically oriented, the newspaper lit and the cooker functions as a chimney type starter for igniting the charcoal. During startup, the convective heat is vertically channeled by the griddle, resulting in elevated temperatures that produce a self cleaning result on both the grill rack and the griddle. After starting, a heating mode is provided whereby cooking vessels may be placed directly on the top door for heating and/or warming. Opening the top door allows a skillet, wok or the like to be directly heated provides a frying mode. For the other modes, the cooker is horizontally positioned. For dual zone griddle cooking, the top is opened and foods may be prepared on the griddle either a hot zone above the coals, or in a cooler zone above the combusted paper. If a uniform heating zone is desired, the griddle is removed to release the gate, and the cooker gently shaken to distribute the coals. The griddle may be replaced or conventional open fire grilling conducted directly on the grill rack. For baking and roasting modes the lid may be closed. Throughout the course of activities, the cooker may be replenished with charcoal as required. At the end of the day, the cooker functions as a heating source for warmth or dessert cooking. For packing or storage, the ashes are removed through the lower door, the griddle replaced, the lid closed; and the self cleaned unit is ready for the next use.

Accordingly, it is an object of the present invention to provide a portable charcoal grill that provides a variety of cooking needs suited to outdoor activities.

Another object is to provide a portable outdoor grill that may be prepared for use in advance, and avoids the need for separate starting devices, lighting fluid and fuel.

A further object of the invention is to provide a self cleaning outdoor grill.

Yet another object is to provide a portable grill wherein a single unit can be configured for starting, heating, grilling, frying, and roasting.

DESCRIPTION OF THE DRAWINGS

The above and other features of the present invention will become apparent upon reading the following description of the preferred embodiment, taken in conjunction with the accompanying drawings in which.

DETAILED DESCRIPTION OF THE PREFERRED EMBODIMENT

Figure 1:
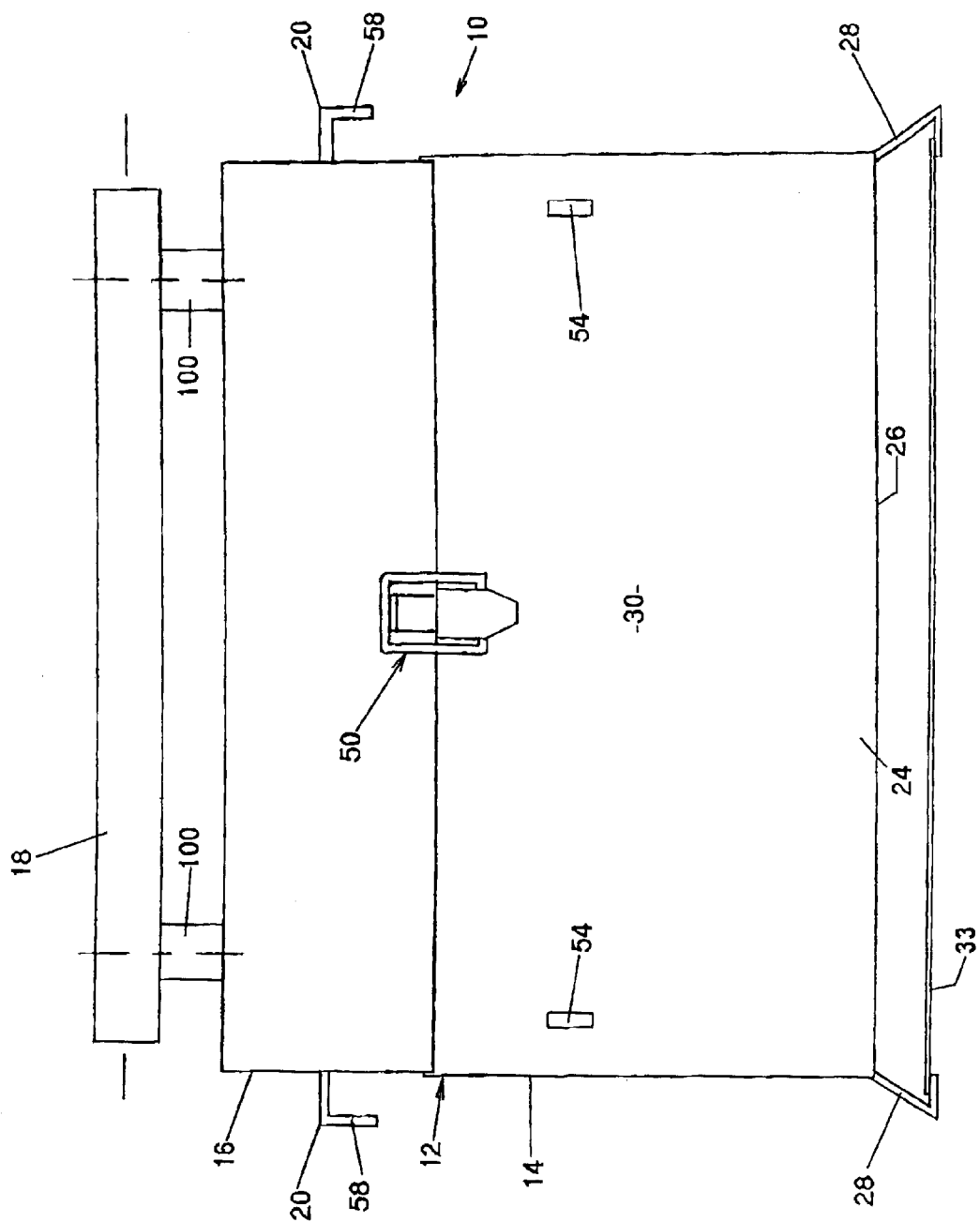
FIG. 1 is a front elevational view of a multiple mode charcoal cooker in accordance with a preferred embodiment of the invention.

Referring to the drawings for the purpose of illustrating a preferred embodiment of the invention and not for limiting same, FIGS. 1 through 4 show a portable multiple mode charcoal cooker 10 comprising a rectangular sheet metal housing 12 including a firebox 14 and a lid 16 defining an interior compartment. A longitudinal carrying handle 18 is attached to the top surface the lid 16 for transporting the cooker 10 between locations. As hereinafter described, the cooker 10 may be deployed in a plurality of cooking modes for use in diverse environments.

The firebox 14 is a generally rectangular box configuration having an open upper end and carrying sliding doors 20 at the lateral sides thereof. The firebox 14 includes a generally U-shaped center section having a rectangular base wall 26 terminating at the sides with integrally downwardly and outwardly extending support legs 28, and integrally connected with a transversely spaced front wall 30 and rear wall 32 of generally rectangular configuration. A rectangular heat shield 33 is attached to the support legs 28 for providing additional heat insulation at the support surface.

Figure 9:
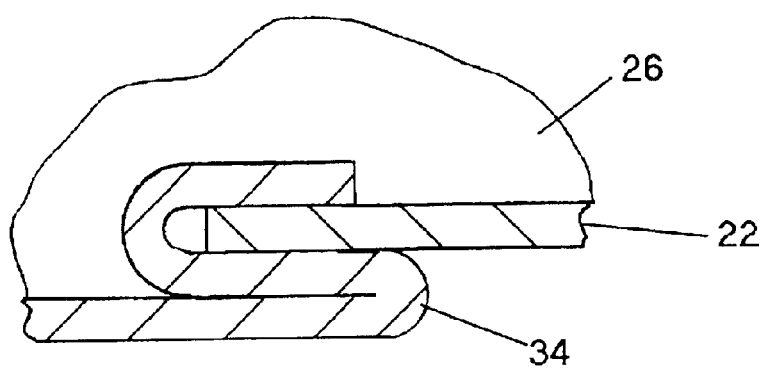
FIG. 9 is a fragmentary cross sectional view of the mounting flange and door joint.
Figure 10:
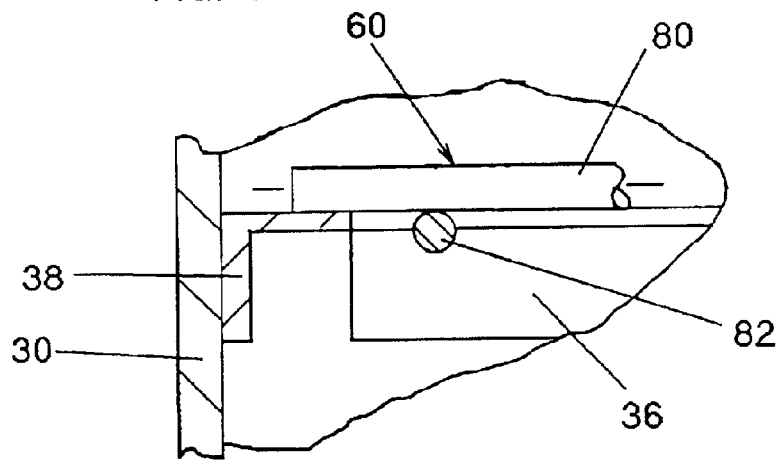
FIG. 10 is a fragmentary side cross sectional view of the grill rack mounting.
Figure 11:
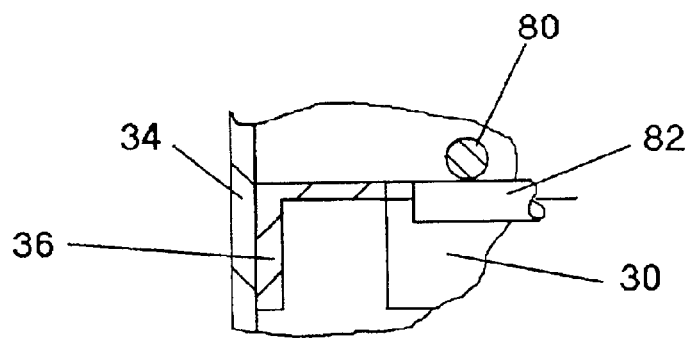
FIG. 11 is a fragmentary front cross sectional view of the grill rack mounting.

Referring additionally to FIG. 9, the ends of the walls 30, 32 are provided with inwardly turned retaining flanges 34 for slidably capturing the sides of the doors 20 to permit movement between the lowered closed positions, and raised open positions. A pair of L-shaped traverse reinforcing ledges 36 are connected between the tops of the front wall 30 and the rear wall 32 for strengthening the base 26 (FIG. 11). A pair of L-shaped longitudinal reinforcing ledges 38 are attached to the inner surfaces of the front and rear walls and aligned with the ledges 36 for supporting a grill rack as described below (FIG. 10).

The lid 16 has a generally inverted U-shaped center section 40 and longitudinally spaced end walls 42. The lower rear longitudinal end of the center section 40 is pivotally connected by a piano hinge 44 to the upper end of the rear wall 32 of the base 26 for movement between a lower closed position, and an open position approximately 180° therefrom. The front wall 46 of the center section 40 is provided with a downwardly depending lip 48 overlying the upper end of the front wall in the closed position. A toggle lock assembly 50 is attached to the front walls of the firebox 14 and the lid 16 for releasably maintaining the closed position in use and during transport.

Figure 2:
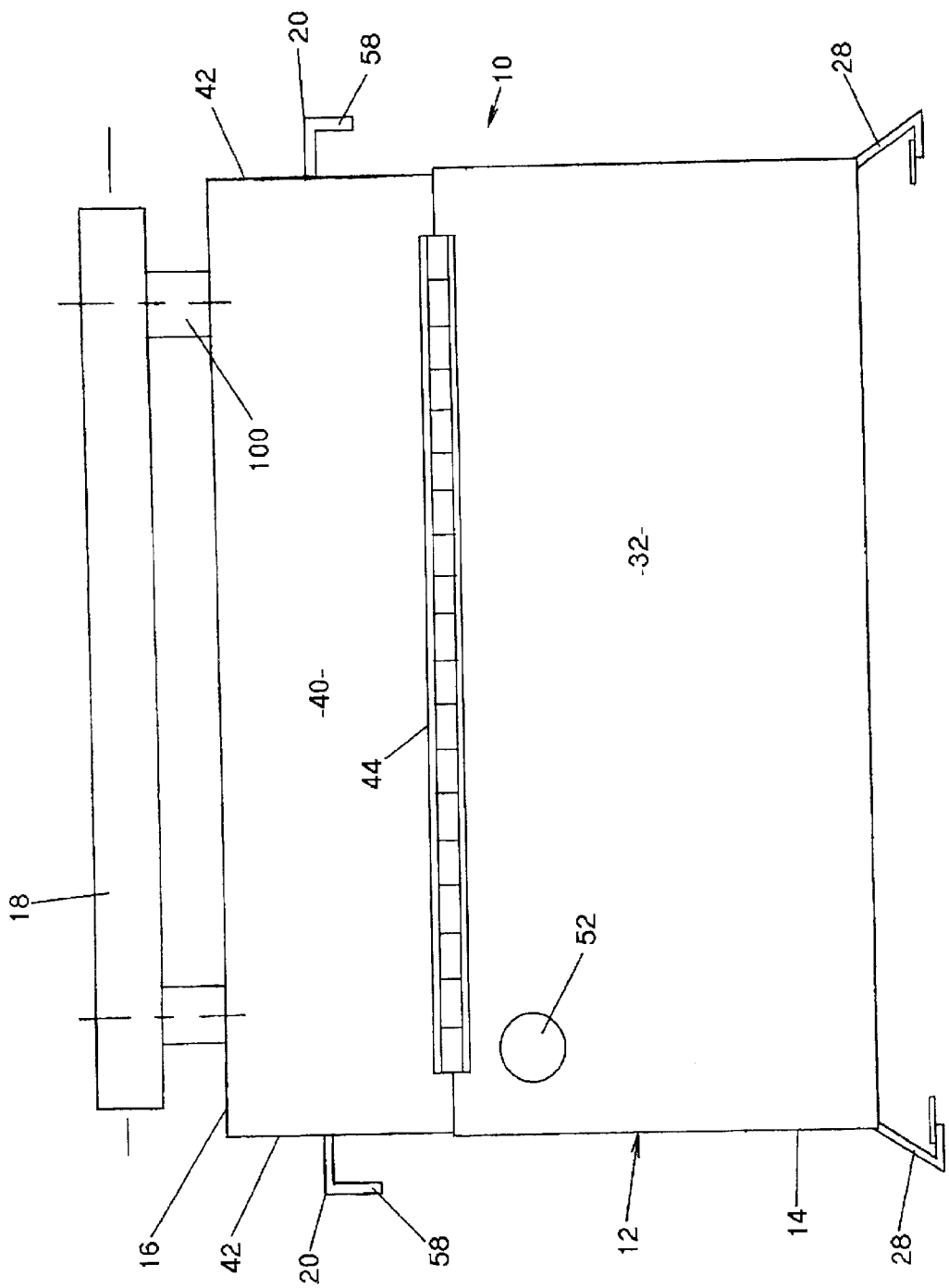
FIG. 2 is a rear view of the cooker shown in FIG. 1.

Referring to FIG. 2, the rear wall of the firebox 14 is provided with a circular ignition opening 52 adjacent the hinge 44 and the bottom door 20 for igniting the fuel supply as described below. The front wall 30 of the firebox 14 is provided with a pair a longitudinally spaced, vertically aligned mounting slots 54 for supporting a griddle in a serving position as also described below.

Figure 3:
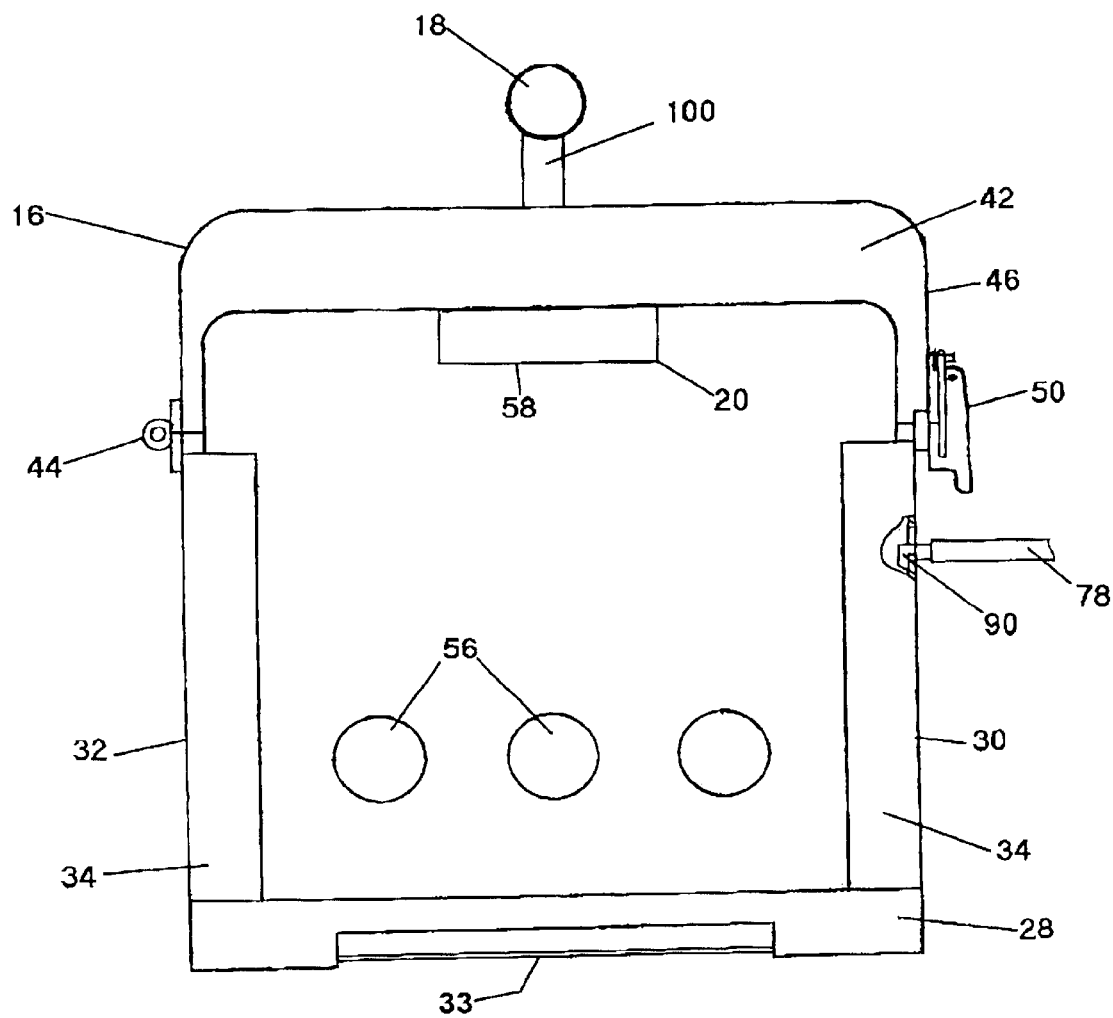
FIG. 3 is a left end view of the cooker shown in FIG. 1.
Figure 4:
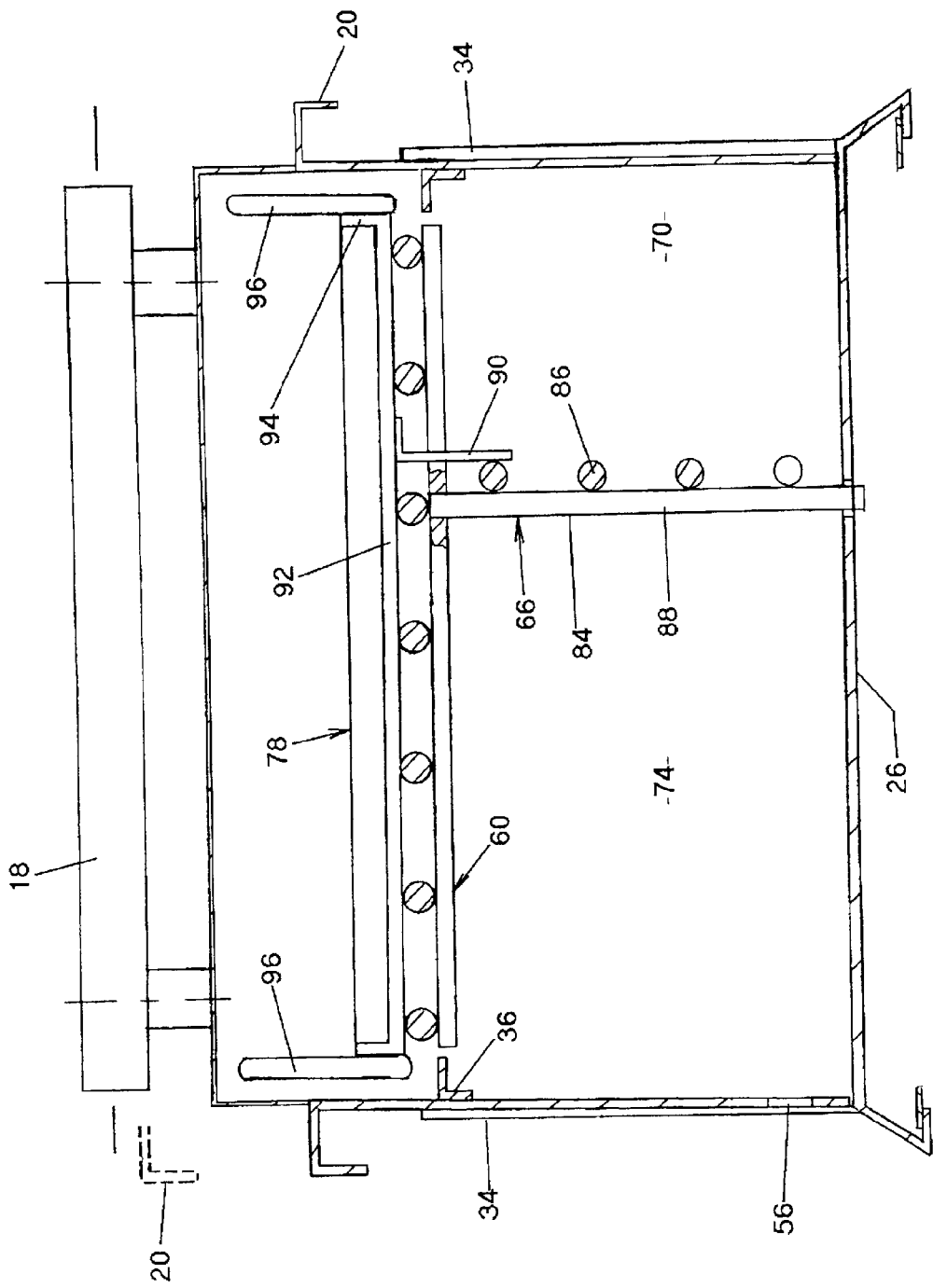
FIG. 4 is a front cross sectional view of the cooker in the baking mode.

As shown in FIGS. 3 and 4, the side doors 20 are provided with a plurality of horizontally aligned circular vent openings 56 adjacent the lower ends thereof. The doors 20 are provided with integrally formed, outwardly extending lifting handles 58 at the upper ends thereof for effecting movement of the doors between the open and closed positions. In a rotated vertical position, the base leg 28 and the handle 18 support the cooker 10, for the lighting, heating, and frying modes.

Figure 5:
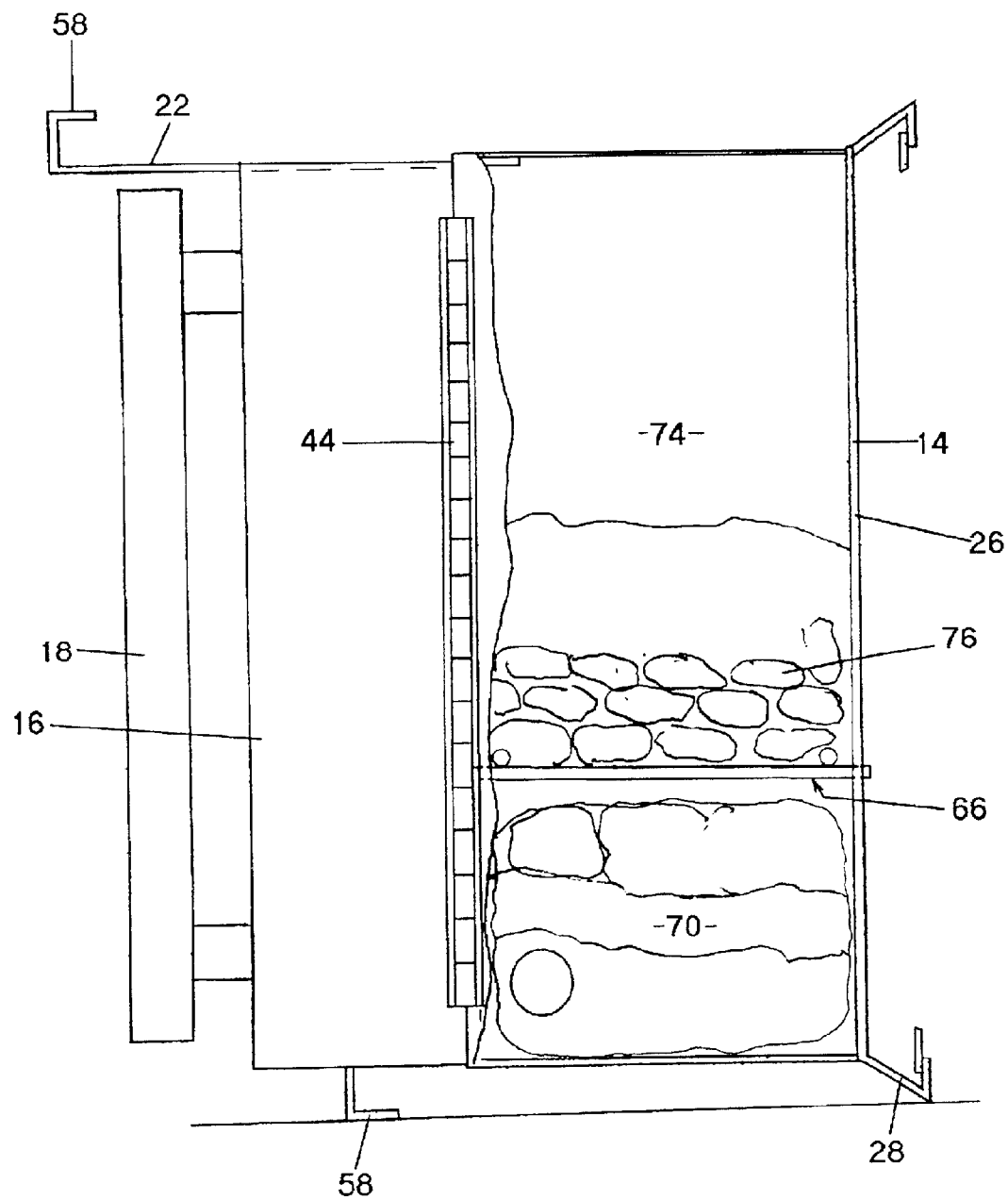
FIG. 5 is a partially section side elevational view of the cooker in the starting, frying and heat modes.
Figure 6:
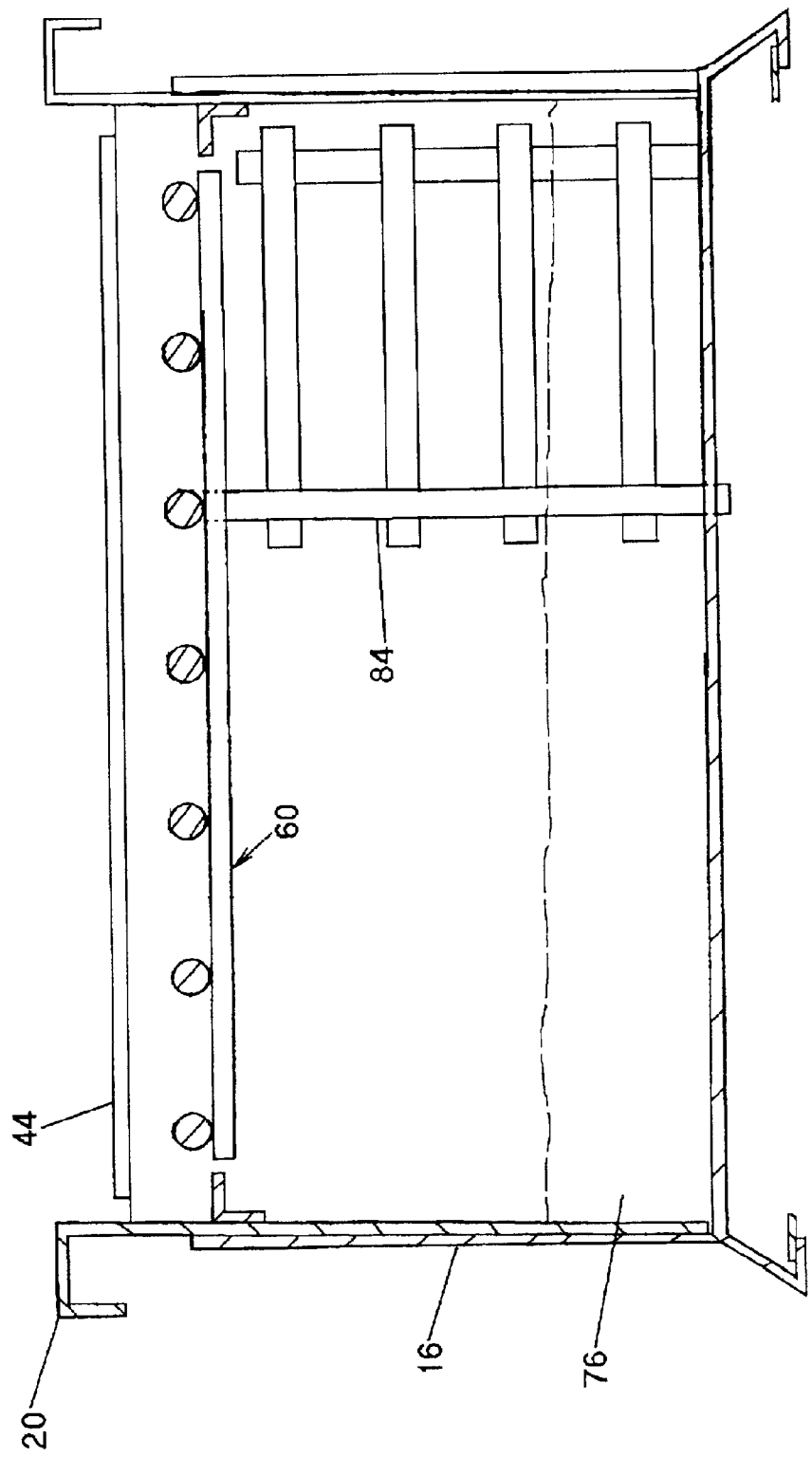
FIG. 6 is a front cross sectional view of the cooker in the grilling mode.
Figure 7:
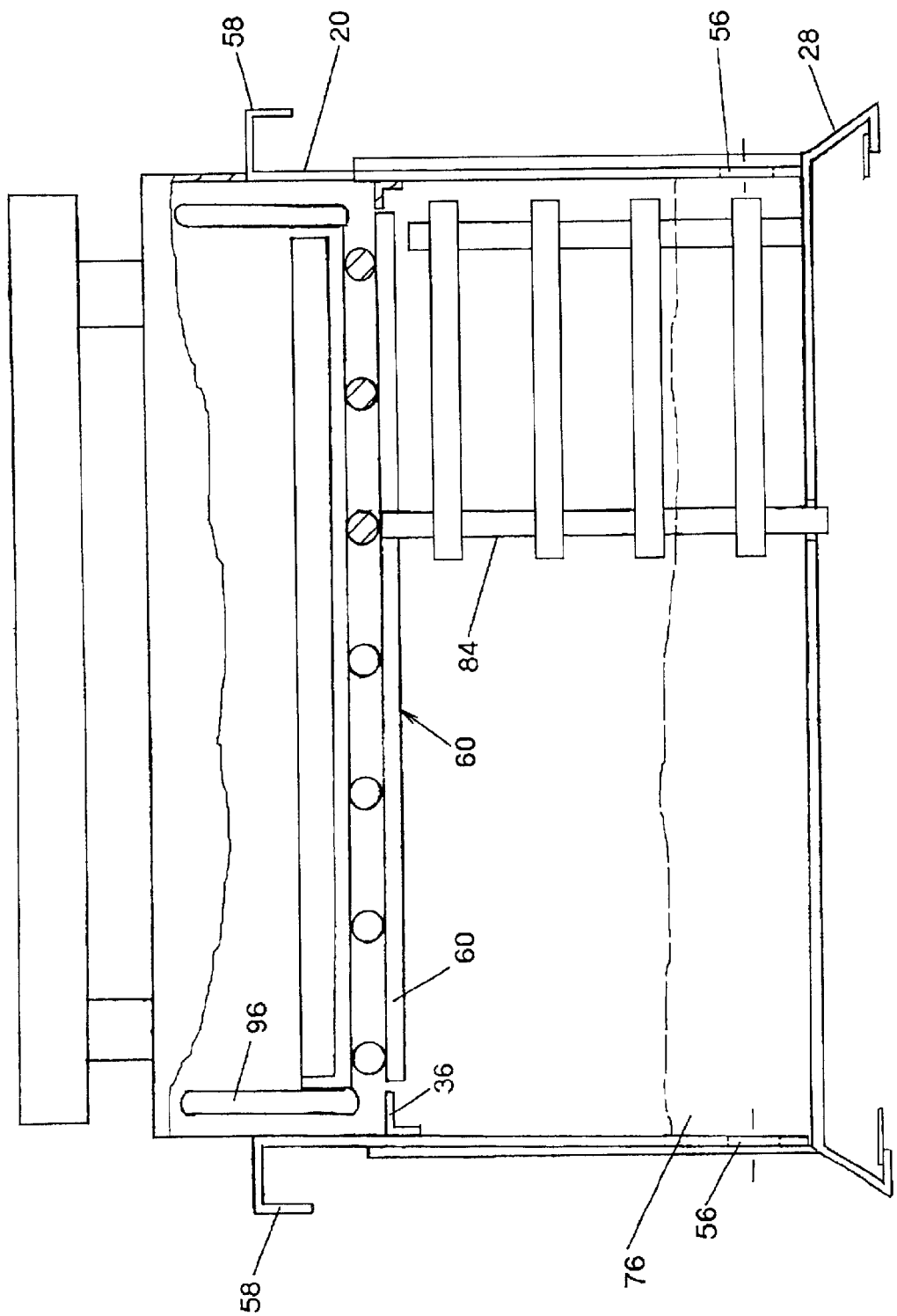
FIG. 7 is a fragmentary cross section view showing the cooker in the roasting mode.
Figure 8:
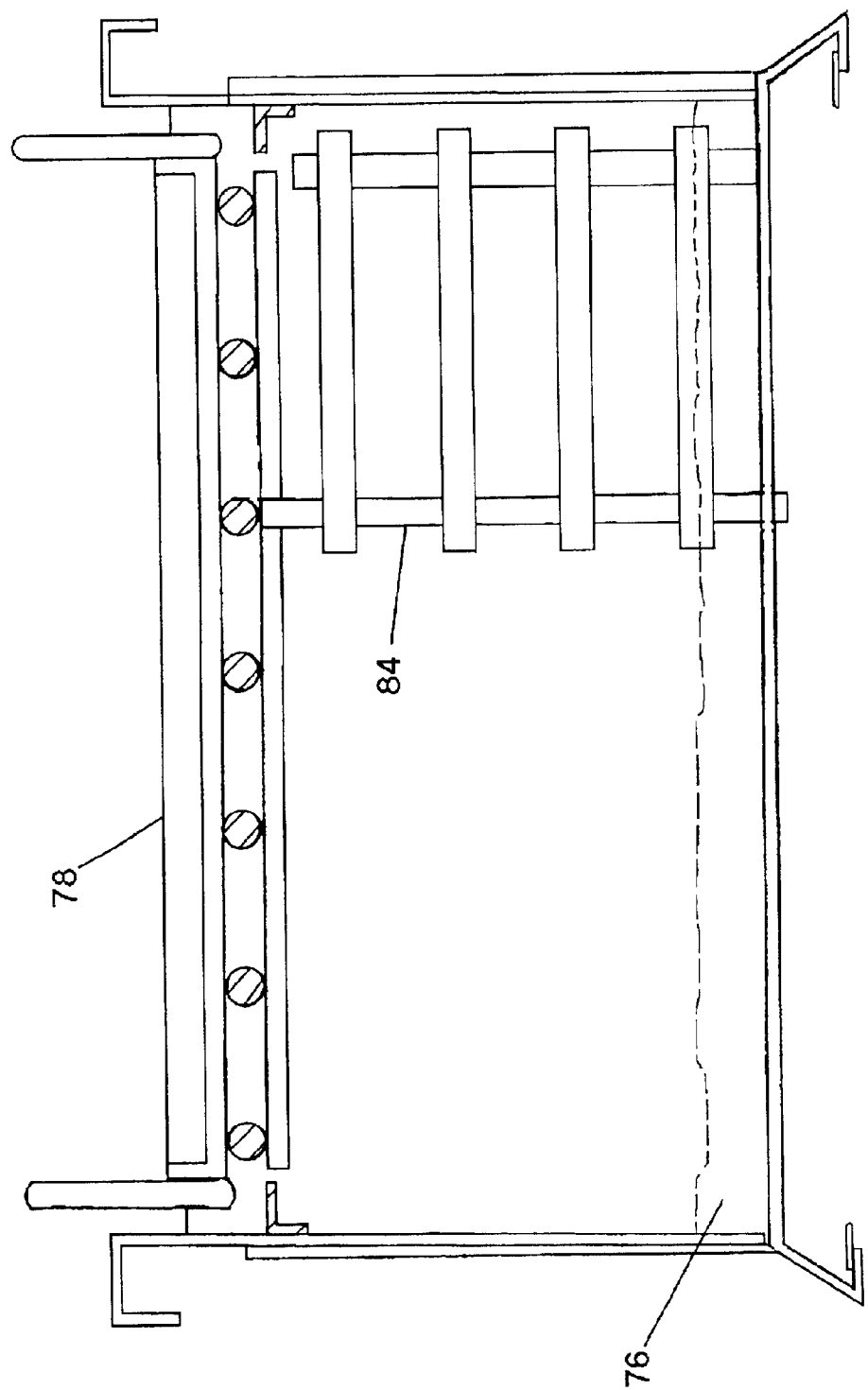
FIG. 8 is a front cross sectional view of the cooker in the griddle mode.
Figure 12:
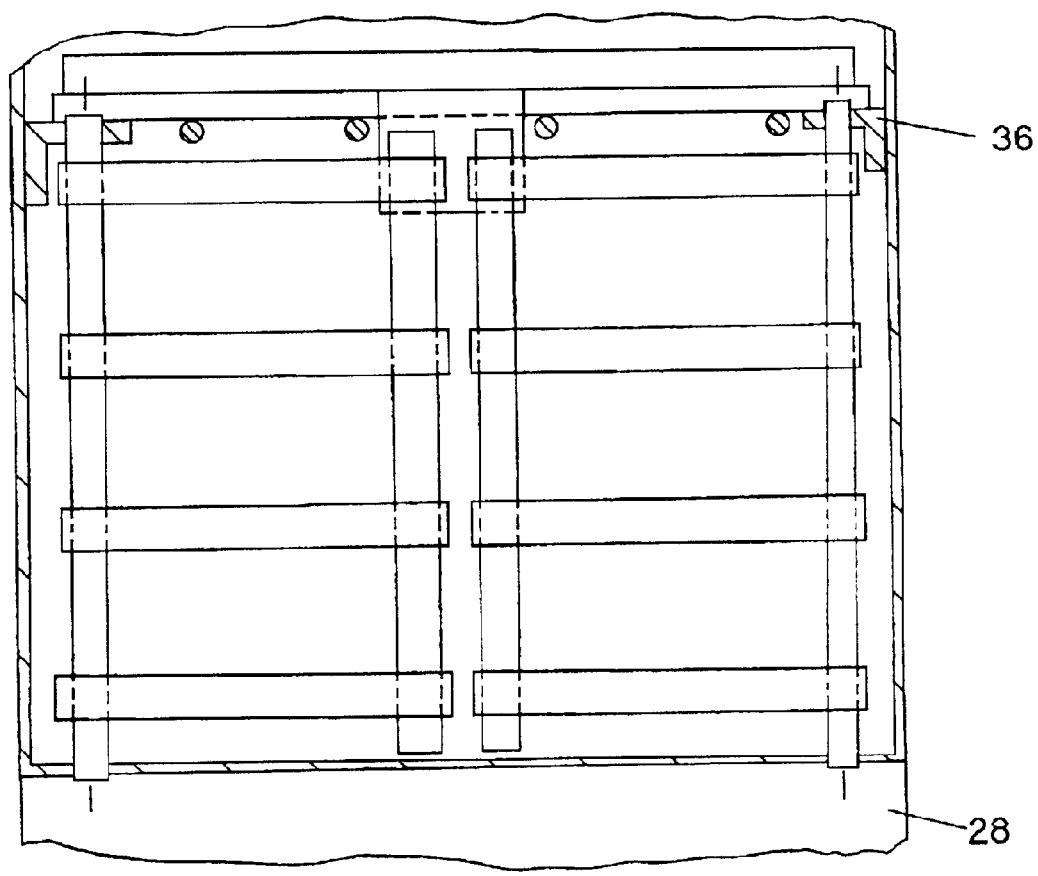
FIG. 12 is a fragmentary cross sectional view taken along line 12—12 in FIG. 4.

Referring to FIGS. 4 and 5, the interior of the cooker 10 includes a cooking rack 60 horizontally fixed to the ledges 38 and dividing the interior into an upper cooking zone and a lower heating zone. As additionally shown in FIG. 12, a vertical charcoal gate 66 divides the heating zone into an ignition compartment 70 carrying a starter material 72, such as crumpled newspaper or like, and a fuel compartment 74 carrying charcoal 76 or other ignitable material suitable for heating and cooking. A rectangular griddle 78 is supported on the rack 60.

The rack 60 comprises a plurality of longitudinally spaced, laterally extending rods 80 connected to a pair of laterally spaced, longitudinally extending runners 82. The ends of the rods 80 are attached to the ledges 38 for securing the rack 60 in place. The charcoal gate 66 includes a pair of juxtaposed gate sections 84. Each gate section 84 includes a plurality of laterally spaced rods 86 interconnected by top and bottom runners 88. The outer rods 86 adjacent the front and the rear wall 32 of the firebox 14 are pivotally supported at apertures in the ledges 56 and the base wall 26. The gate sections 84 may accordingly pivot between an in-line closed position transverse to the walls 30, 32 isolating the charcoal 76 and starting material 74, and a closed position overlying the walls and permitting a spreading of ignited charcoal on the bottom wall 26.

The griddle 78 is provided with a downwardly extending stop plate 90, which projects between the rods of the rack and engages the bottom surface of the gate sections 84 to maintain the closed position of the gate 66 during transport and ignition. The griddle 78 has a rectangular center section 92 overlying the rack 60 bounded by an upwardly turned rim 94. A pair wire loop lifting handles 96 are attached at the sides of the griddle 78. Referring to FIG. 2, the rear edge of the griddle 78 is provided with a pair of support hooks 98 that are received in the slots 54 in the front wall 30 for mounting the griddle in a serving position.

The handle 18 has an elongated shape of desired cross section and is formed of an insulating material. The handle 18 extends longitudinally over the center of the top wall of the lid 16, and is connected thereto and spaced therefrom by standoff legs 100. A cylindrical wood handle is satisfactory. Alternative materials such as high temperature plastics may also be used.

The cooker 10 may be conveniently stored until use, filled with charcoal and starting materials, and transported to a desired site, requiring only an ignition source, such as a match, to begin starting of the charcoal prior to cooking, thereby avoiding the need for on-site handling of fuel materials. To charge the cooker, the firebox 14 is placed on a horizontal surface, the bottom door 20 moved to the open position, and the gate sections 84 pivoted to the closed position. The griddle 78 is placed the rack 60 with the stop plate 90 engaging the gate sections 84 to maintain the closed position thereof. Thereafter, the lid 16 lowered to the closed position and the lock assembly 50 latched. A sufficient supply of starting material 74 such as crumpled newspaper is stuffed into the starting chamber and the lower door 20 closed. The cooker 10 is moved to a vertical position, the upper door 20 opened and a desired supply of charcoal 76 placed on the charcoal gate 66. The upper door is closed and the cooker is thereafter preset for transport to the cooking site.

For starting the cooker in chimney fashion, the cooker 10 is located on a suitable supporting surface, and spaced therefrom by the leg 28 and the door handle 18 as shown in FIG. 5. The top door is then opened, and the starting material ignited through the ignition opening 52. During ignition, air is drafted upwardly between the door ventilation holes 56, resulting in a vertical convection path adjacent the rack 60 and the griddle 78, which has been determined to be of sufficient temperature to effect self cleaning of the cooking surfaces. For alternative self cleaning at the completion of use, additional charcoal may be added to the fuel compartment, and post use self cleaning effected in the above vertical position. For additionally cleaning the griddle surfaces, the griddle may be inverted to place the cooking surface directly adjacent the rack 60.

After ignition of the charcoal, the cooker 10 may be deployed in a plurality of modes for preparing foods using a variety of cooking techniques throughout the day, as well as providing environmental heating during inclement weather. At the start of the day, the cooker 10 may be vertically oriented as shown in FIG. 11 with the upper door closed. In this position, the upper door functions as a heating plate for cooking activities such as preparing coffee or heating foods in smaller cooking vessels. Alternatively, the upper door may be opened to provide a direct heating cooking burner for use, by way of example, in frying foods in a skillet, wok or like equipment. In this mode, the charcoal is supported on the gate, in closer proximity to the cooking implement.

For midday cooking, the lid 16 is opened and the griddle 78 removed, thereby releasing the gate sections 84 and allowing the ignited charcoal to be distributed over the bottom surface. Charcoal distribution may be assisted by gentle shaking. For multiple zone cooking, the gate may be maintained in the closed position. For griddle cooking on a heated solid surface, the griddle 76 is replaced, and a variety of foods prepared by direct cooking on the griddle center section.

Later in the day, for grilling and roasting of foods, the griddle 76 is removed and hung on the front wall 30 at the mounting slots 54 whereat the griddle 76 may be used as a preparation or storage shelf. Desired foods may be placed on the rack, and simply grilled with the lid 16 in the open position. Alternatively, the lid may be closed for roasting and baking foods.

At the conclusion of the day, the cooker may be placed on end, the top door opened, and dessert foodstuffs roasted over the open coals. Adding additional charcoal, the cooker effectively functions as a campfire heater.

At the conclusion of activities, as discussed above, the cooker may be reassembled, the lid closed and additional charcoal added. With the top door closed, the cooker will effect self cleaning of the rack and griddle, in a manner previously described. After the coals are extinguished, the bottom door is opened and the ashes disposed in a safe manner. The bottom door is then closed, and the cooker is compactly organized for transportation and storage until next use.

Having thus described a presently preferred embodiment of the present invention, it will now be appreciated that the objects of the invention have been flly achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed is:

1. A portable outdoor cooker comprising: a U-shaped housing including a rectangular base wall having an upwardly extending front wall and an upwardly extending rear wall integral with the longitudinal sides thereof thereby defining an open top and longitudinally spaced open ends; a grill rack fixedly supported by said front wall and said rear wall adjacent said open top, said grill rack and said base wall defining a heating chamber therebetween; a griddle having a planar cooking surface overlying said grill rack; a first door slidably supported by said front wall and said rear wall at one open end; a second door slidably supported by said front wall and said rear wall at the other open end, said first door and said second door being manually shiftable between a closed position enclosing said open end and an open position allowing access to said heating chamber for placement of fuel and starting materials therein; a cover member pivotally connected to said rear wall and pivotable between a closed position enclosing said open end and defining with said grill rack a cooking chamber; and vent means in said door members for establishing a convection path through said heating chamber and bounded by said base unit and said griddle so as to be effective, upon ignition of said fuel material with said doors in said closed position and said housing supported on one of said doors, to raise the temperature of said grill rack and said griddle to a self cleaning temperature for removal of accumulations thereon.

2. The cooker as recited in claim 1 a wherein said starting material is crumpled paper and said fuel material is charcoal.

3. A portable charcoal cooker comprising: a base unit having a bottom wall and transversely extending front and rear walls, said bottom wall, said front wall and said rear wall defining a open top, and open sides; a cover member pivotally connected to said rear wall and moveable between a open position remote from said open top and a closed position overlying said open top; a door member operatively connected to said base unit adjacent each open side, and progressively moveable between a closed position overlying an open side and an open position remote therefrom; a grill rack member carried by said base unit adjacent said open top and defining with said base unit a heating chamber; gate means pivotally carried by said base unit intermediate said door members within said heating chamber, said gate means being pivotal between a first closed position transverse to said front wall and said rear wall of said base unit and a second open position parallel to said Front wall and said rear wall, said gate means in said first closed position defining in said heating chamber a first compartment for receiving a starting material and a second compartment for receiving a fuel material; stop means for maintaining said gate means in said first closed position and releasable to permit said gate means to pivot to said second open position thereby accommodating distribution of ignited fuel material on said base wall and vent means associated with said base unit for establishing a convection path through said heating chamber.

4. The cooker as recited in claim 3 including a griddle member having a planar surface engaging an upper surface of said rack member and including a projecting stop member functioning as said stop means for engaging said gate means to maintain said first closed position.

5. The cooker as recited in claim 4 wherein said door members are slidably supported by said base unit for progressive movement between said open position and said closed position.

6. The cooker as recited in claim 5 wherein said vent means are apertures in said door members.

7. The cooker as recited in claim 6 wherein an ignition aperture is formed in said rear wall for facilitating lighting said starting material.

8. The cooker as recited in claim 7 wherein said rack member is fixedly connected to said base unit.

9. The cooker as recited in claim 8 wherein a piano hinge pivotally connects said cover member to said rear wall of said base unit.

* * * * *